May 16, 1944. H. F. STORM 2,349,057
FREQUENCY MULTIPLIER
Filed July 13, 1942
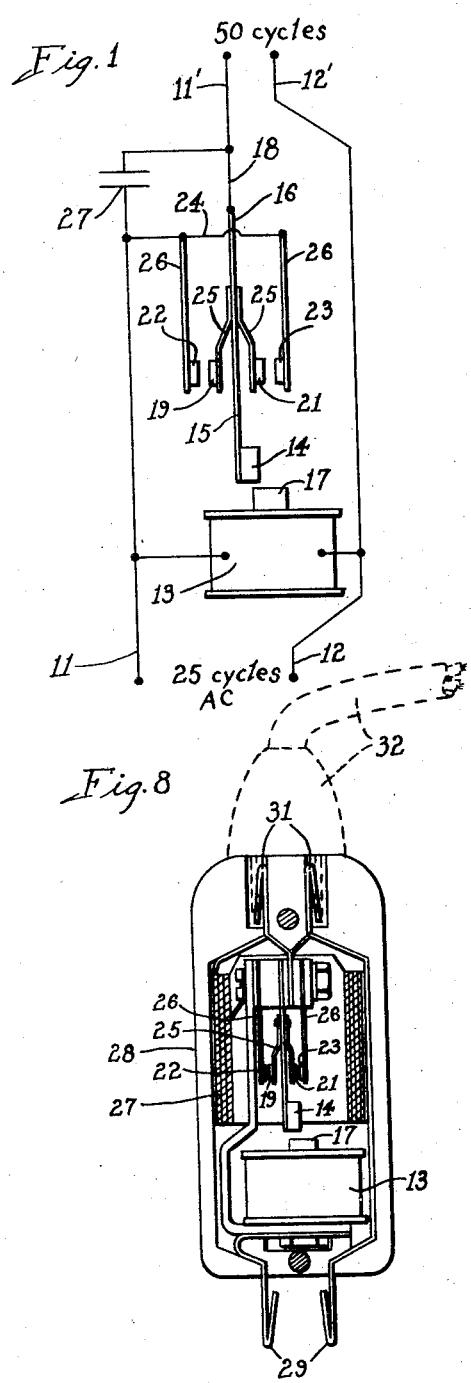
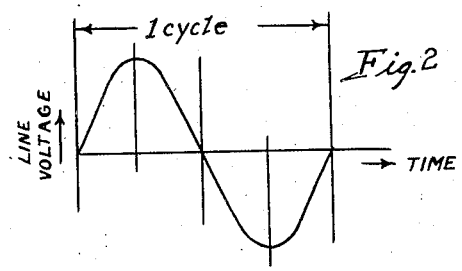
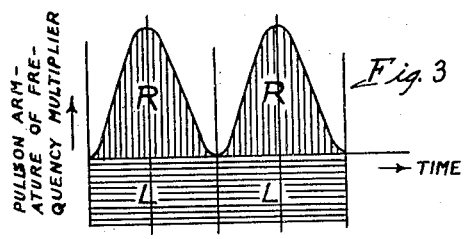
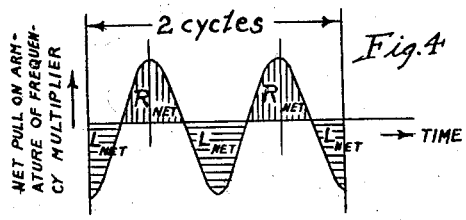
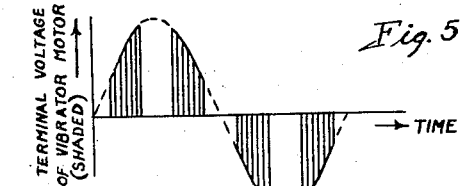
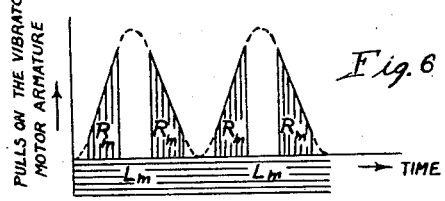
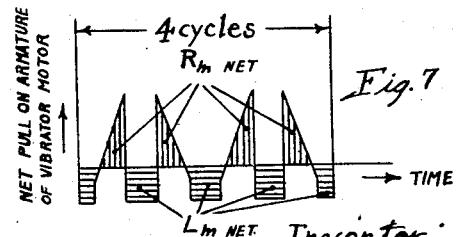
Inventor:
Herbert F. Storm
By McCanne, Wintercorn & Morsbach
Attys.

Patented May 16, 1944

2,349,057

UNITED STATES PATENT OFFICE 2,349,057

FREQUENCY MULTIPLIER

Herbert F. Storm, Chicago, Ill., assignor to Chicago Flexible Shaft Company, Chicago, Ill., a corporation of Illinois Application July 13, 1942, Serial No. 450,787

5 Claims. (Cl. 172—281)

This invention relates to means for multiplying the frequency of a source of alternating electric current so that the current delivery will be of a frequency higher than that of the source.

The primary object of my invention is to provide a simplified frequency multiplier adapted for various applications, particularly for electrical appliances such as electric dry shavers operated by vibrator type motors. In the case of electric dry shavers of this kind, the question of the line frequency is of importance for the reason that the cutter of the shaving device is operated in direct response to and in synchronism with the frequency of the alternating current supply. Since the shaving time depends largely on the number of cuts made by the cutter blade per second it is apparent that the shaving speed is directly influenced by the number of cycles per second of the vibrator motor. While the line frequency of 60 cycles per second so common in most portions of the country is satisfactory for operating vibrator motors of dry shavers, the shaving speed is greatly diminished in localities having a line frequency of only 25 cycles. The present invention, therefore, provides improved means for converting these lower line frequencies to higher frequencies for use in the operation of electrical devices such as vibratory motors for operating electric dry shavers and other devices.

Other objects and attendant advantages will be appreciated by those skilled in this art as the invention becomes better understood by reference to the following description when considered in connection with the accompanying drawing, in which—

Figure 1 is a diagrammatic view showing an electric circuit embodying my invention;

Figs. 2 to 7 are diagrams explanatory of the invention; and

Fig. 8 is a somewhat diagrammatic view showing in longitudinal section a frequency multiplier embodying my invention and showing in dotted lines the cord plug of an electric dry shaver or other appliance connected thereto.

Referring more particularly to Figure 1, this shows an electric circuit the current supply end of which has leads 11 and 12 connected to a source of alternating current. For purpose of illustration, assume that the frequency is 25 cycles per second. In accordance with my invention this frequency will be changed to 50 cycles at the current delivery end of the circuit. Across the lead wires is connected a coil 13 of an electromagnetic motor commonly known as a vibrator motor which will be energized at the line frequency. An armature element 14 is fixed to the free end of a reed or spring member 15 which in turn is suitably mounted at its end 16 so that it will vibrate laterally in response to the pulsating flow of magnetic flux from the pole piece 17 resulting from energizing the coil. The vibratory armature is connected by the wire 18 to the 50 cycle side of the circuit. The vibratory armature member carries a pair of contacts 19 and 21 which are adapted to make and break contact with a pair of contacts 22 and 23 which are connected by wire 24 to the side 11 of the line. In this case each of the contacts 19 and 21 is carried on a spring member 25 attached to the spring member 15 and each of the contacts 22 and 23 is carried on the free end of a spring member 26 which has a fixed support at its opposite end. Both pairs of contacts are connected in parallel. With this arrangement the spring member 15 will oscillate at 50 complete cycles per second in response to vibration of the motor. This will be apparent by referring first to Fig. 2 which shows the sine curve of one cycle of the alternating current at the source and Figs. 3 and 4 which show diagrammatically the electromagnetic and spring forces. Since the magnetic pull of the magnet 17 depends only on the intensity of the current and not on its direction, the magnetic pull reaches a maximum value when the current reaches a maximum value. Fig. 3 shows the sequence of the magnetic pull for one cycle, marked with vertical lines. The letter R denotes magnetic pull of the armature 14 to the right, as shown in Fig. 1. The spring 15 tends to move the armature in the opposite direction, indicated by the horizontal lines L in Fig. 3. The resulting net force for an intermediate position of spring member 15 is the difference between the magnetic pull and the spring pull. This net force is plotted diagrammatically in Fig. 4, marked $L_{net}$, when pulling to the left, and $R_{net}$, when pulling to the right. Since the armature 14 follows the net force it makes two complete mechanical cycles while the line voltage makes only one electrical cycle.

The make and break action of the contacts 19—22, and 21—23, will now be observed, referring to Figs. 5, 6, and 7. The terms "make" and "break" are used to indicate each time the contacts close and open the circuit which feeds through 11' and 12' into the power consuming device. By this contact action, the line voltage in Fig. 5 is cut into four sections shown by the full lines along the sine curve. Assuming that the power consuming device is a motor of the vibrator type, these four voltage sections exercise four corresponding, unidirectional magnetic pulls on the armature of the vibrator motor. If we arbitrarily assume the direction of the unidirectional pull as toward the right hand side of the driven vibrator motor, the pull on the armature of the vibrator, due to its spring action, will be to the left. The pull to the right of the motor armature is denoted by $R_m$ in Fig. 6. Since the spring tends to pull the motor armature to the left, this force is shown diagrammatically at $L_m$ in Fig. 6, and as a subtracting force with reference to the magnetic pulls $R_m$. The net force $R_{m\ net}$ and $L_{m\ net}$, respectively, between the pulls $R_m$ and $L_m$ results in motion of the armature of the vibrator motor, and is determined by the difference between the magnetic pull and the spring pull. This net force is shown diagrammatically in Fig. 7. It shows four pulls per electrical cycle to the left, and four to the right. Thus, the motor armature will make four mechanical cycles to one cycle of the line voltage. As compared with a vibrator motor without the frequency doubler such as here disclosed, my vibratory motor makes twice as many cycles. By reference to Fig. 1, the contacts 19—22 make fifty contacts per second and the contacts 21—23 also make fifty contacts per second. Since these pairs of contacts are in parallel they perform one hundred makes and breaks per second. This cuts every current wave into four sections as above described, thereby exercising twice as many net pulls as the line frequency would do without my frequency doubler. This cuts the current flow from the delivery source of the circuit so that it has doubled the number of magnetic impulses for each cycle of alternating current at the source. A suitable condenser 27 may be provided.

An application of my invention is illustrated in Fig. 8 showing my frequency multiplier embodied in a unit designated generally by 28 having plug type terminals 29 corresponding with the leads 11—12 at the input end of the circuit shown in Fig. 1, and socket type terminals 31 corresponding with 11'—12' at the output end of the circuit. This unit is adapted to be plugged into an ordinary current supply socket, thereby becoming an adapter to which any electrical device may be connected for actuation at double the frequency of the alternating current at the source. In the illustrated case a dry shaver (not shown) of the type operated by a vibratory motor is connected by a suitable cord and plug 32 to the output end of the unit 28. In this embodiment the reference numerals used in the description of Fig. 1 apply to corresponding parts in Fig. 8. It will be understood that this embodiment is for purpose of illustration and that in applying my invention to practice it may be embodied in many forms in keeping with the principle herein disclosed.

From the foregoing it will be apparent that various modifications may be made in the application of my invention without departing from the spirit and scope thereof, and I desire, therefore, that only such limitations shall be placed thereon as are imposed by the prior art and the appended claims.

I claim:

1. A frequency multiplier comprising in combination with a current supply circuit and current delivery circuit wherein the current supply circuit is energized by a source of alternating current, of a vibratory member adapted to vibrate in synchronism with the supply source of alternating current, the vibrating member being energized by a coil which is directly energized by the input frequency and contacts operated by said vibratory member to connect the current supply circuit to and disconnect it from the current delivery circuit at a frequency which is a multiple of the frequency with which the current supply voltage changes its sign.

2. A frequency multiplier comprising in combination with a current supply circuit and a current delivery circuit wherein the current supply current is energized by a source of alternating current, of an electromagnetic device having electromagnetic means energized in parallel with the input voltage and having a vibratory member actuated by said electromagnetic means to vibrate at a frequency in synchronism with the supply source of alternating current, and contacts arranged to connect and disconnect the current supply circuit with the current delivery circuit and actuated in synchronism with said vibratory member to effect connection and disconnection of said contacts at a frequency which is a multiple of the frequency with which the supply voltage changes its sign.

3. A frequency multiplier comprising in combination with a current supply circuit and a current delivery circuit wherein the current supply circuit is energized by a source of alternating current, of electromagnetic means energized in parallel with the input voltage and having a reed actuated by said electromagnetic means so that it vibrates due to the periodicity of the supply voltage in synchronism with the supply source of alternating current, and contacts operated by vibration of the reed to connect and disconnect the current supply circuit with the current delivery circuit at a frequency which is a multiple of the frequency with which the supply voltage changes its sign.

4. A frequency multiplier comprising an electromagnetic coil energized in parallel with the input voltage of an alternating current supply, a vibratory spring member actuated by said electromagnetic coil adapted to have two complete cycles of movement in response to one cycle of the alternating current input to the coil, two pairs of make and break contacts each pair including a fixed contact and a contact moved by the vibratory member, and a circuit connecting the pairs of contacts in parallel so that the vibratory member will make and break the circuit alternately with the closing and opening of each pair of contacts for each complete cycle of movement of said vibratory member, thereby doubling the frequency cycle at the output end of the circuit as compared with the frequency cycle at the input end.

5. A frequency multiplier comprising an electromagnetic coil energized in parallel with the input voltage of an alternating current supply, a vibratory member having an armature adapted to be attracted by energization of the coil, two pairs of make and break contacts each pair including a fixed contact and a contact connected to and moving with the vibratory member, the movable contacts being arranged so that one will make contact with its complemental contact member upon movement of the vibratory member in one direction in response to magnetic pull of the coil and will break said contact when said vibratory member moves in the opposite direction, and the other movable contact member will make contact with its complemental contact member upon movement of the vibratory member in said other direction under the influence of its spring force and will break said contact when the vibratory member moves in the opposite direction, said pair of contacts being connected in parallel, whereby the vibratory member will make and break the circuit alternately with each pair of contacts for each complete cycle of its movement, thereby doubling the frequency cycle at the output end of the circuit as compared with the frequency at the input end.

HERBERT F. STORM.